US009894664B2

(12) United States Patent
Wigren et al.

(10) Patent No.: US 9,894,664 B2
(45) **Date of Patent: *Feb. 13, 2018**

(54) UPLINK SCHEDULING WHEN USING INTERFERENCE SUPPRESSION

(75) Inventors: Torbjörn Wigren, Uppsala (SE); Klas Johansson, Sundbyberg (SE); Erik Geijer Lundin, Stockholm (SE); Anders Lamm, Molndal (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 834 days.

This patent is subject to a terminal disclaimer.

(21) Appl. No.: 14/361,387

(22) PCT Filed: Nov. 30, 2011

(86) PCT No.: PCT/SE2011/051458

§ 371 (c)(1),
(2), (4) Date: May 29, 2014

(87) PCT Pub. No.: WO2013/081514

PCT Pub. Date: Jun. 6, 2013

(65) Prior Publication Data

US 2014/0334455 A1 Nov. 13, 2014
US 2017/0280466 A9 Sep. 28, 2017

Related U.S. Application Data

(60) Provisional application No. 61/448,855, filed on Mar. 3, 2011, provisional application No. 61/421,754, filed on Dec. 10, 2010.

(51) Int. Cl.
*H04W 72/08* (2009.01)
*H04W 72/12* (2009.01)
(Continued)

(52) U.S. Cl.
CPC ........ *H04W 72/085* (2013.01); *H04B 7/2618* (2013.01); *H04W 24/08* (2013.01); *H04W 72/1268* (2013.01)

(58) Field of Classification Search
CPC .............. H04B 1/7107; H04B 1/71072; H04B 2001/7152; H04B 7/2618; H04B 1/7115; H04B 2201/709727
See application file for complete search history.

(56) References Cited

U.S. PATENT DOCUMENTS

2006/0194546 A1* 8/2006 Gunnarsson .......... H04W 28/18 455/69
2007/0054619 A1* 3/2007 Kinnunen ............. H04W 28/26 455/63.1

(Continued)

FOREIGN PATENT DOCUMENTS

EP 2649853 A1 10/2013
WO WO 2009/108088 A1 9/2009
WO WO 2010/144004 A1 12/2010

OTHER PUBLICATIONS

International Search Report for PCT Application No. PCT/SE2011/051458 dated Nov. 22, 2012, 4 pages.

(Continued)

*Primary Examiner* — Romani Ohri
(74) *Attorney, Agent, or Firm* — Sage Patent Group

(57) ABSTRACT

A radio base station and a method therein for scheduling an uplink radio resource to a first user equipment in a wireless communication system which employs CDMA are provided. The method includes measuring an Interference Suppression (IS) gain for each user equipment in a set of user equipments currently being served by the radio base station. The method further includes determining a user constellation pertaining to information regarding the different user equipments in the set of user equipments and their respective bitrates, and (Continued)

updating a table of IS gains with the measured IS gain in bins corresponding to the determined user constellation. The method further includes predicting a load based on at least the updated table, and scheduling the uplink radio resource to the first user equipment at least partly based on the predicted load.

20 Claims, 4 Drawing Sheets

(51) Int. Cl.
*H04W 24/08* (2009.01)
*H04B 7/26* (2006.01)

(56) References Cited

U.S. PATENT DOCUMENTS

2007/0155395 A1* 7/2007 Gopalakrishnan .... H04W 28/18 455/453
2008/0227422 A1* 9/2008 Hwang ................ H04B 7/0452 455/278.1
2009/0088080 A1* 4/2009 Zhang ............... H04W 72/0486 455/63.1
2009/0280822 A1* 11/2009 Ericson ................. H04L 1/1877 455/452.2
2010/0135170 A1* 6/2010 Fan ....................... H04W 28/16 370/252
2011/0044299 A1* 2/2011 Spencer ............. H04W 52/262 370/336
2012/0147828 A1* 6/2012 Wigren ............. H04W 72/1268 370/329

OTHER PUBLICATIONS

Written Opinion of the International Searching Authority for PCT Application No. PCT/SE2011/051458 dated Nov. 22, 2012, 8 pages.
Harri Holma et al: "Uplink admission control and soft capacity with MUD in CDMA", Vehicular Technology Conference, 1999. VTC 1999—Fal. IEEE VTS 50$^{th}$; vol. 1; Topic(s): Transportation; Digital Object Identifier: 10.1109/VETECF.1999.797171; Equation 13; pp. 431-435.
3GPP TSG RAN WG1#46; "Signalling Information for Node-B Controlled Uplink Scheduling and Text Proposal for TR 25.827"; Tallinn, Estonia; Aug. 28-Sep. 1, 2006; Tdoc R1-062419; 3$^{rd}$ Generation Partnership Project (3GPP), Mobile Competence Centre; 650, route des Lucioles; F-06921 Sophia-Antipolis Cedex; France; p. 2; "3 The Interference Cancellation technology", 5 pages.
T. Wigren, "Recursive noise floor estimation in WCDMA", IEEE Trans. Veh. Tech., vol. 59, No. 5, pp. 2615-2620, 2010.
T. Wigren, "Soft uplink load estimation in WCDMA", IEEE Trans. Veh. Tech., Mar. 2009, pp. 760-772.
T. Wigren et al.; "Estimation of uplink WCDMA load in a single RBS", Proc. IEEE VTC—2007 Fall, Baltimore, MD, USA, Oct. 1-3, 2007, 5 pp.
E. Dahlman et al.; "Wider-band 'single-carrier' transmission" 3G Evolution—HSPA and LTE for mobile broadband—section 5.1; 2$^{nd}$ edition, Academic Press, 2008. pp. 65-71.

* cited by examiner

| HARQ number | Number of users | User bit rates [kbit/s] | Receiver type | IS gain mean (fraction of air interface load factor) | IS gain variance |
|---|---|---|---|---|---|
| 1 | 3 | 960, 640, 640 | G-rake+ | 0.15 | 0.002 |
| | 2 | 960, 960 | G-rake+ | 0.30 | 0.005 |
| … | … | … | | | |
| 2 | 2 | 1920,1920 | Rake | 0.01 | 0.05 |
| | 4 | 480, 480,480,480 | G-rake+ | 0.06 | 0.001 |
| ... | … | … | | | |
| 8 | 2 | 960, 960 | G-rake+ | 0.37 | 0.004 |
| … | … | … | | | |
| 8 | 1 | 1920 | G-rake+ | 0.21 | 0.002 |

Fig. 3a

| | Nr of users | |
|---|---|---|
| | Rake | G-Rake+ |
| < 500 kbps | 10 | |
| ≥ 500 kbps | 0 | 2 |

Fig. 3b

UPLINK SCHEDULING WHEN USING INTERFERENCE SUPPRESSION

CROSS REFERENCE TO RELATED APPLICATION

This application is a 35 U.S.C. §371 national stage application of PCT International Application No. PCT/SE2011/051458, filed on 30 Nov. 2011, the disclosure and content of which is incorporated by reference herein in its entirety. The above-referenced PCT International Application was published in the English language as International Publication No. WO 2013/081514 A1 on 6 Jun. 2013. The above referenced PCT International Application also claims the benefit of priority from U.S. Application No. 61/448,855 filed Mar. 3, 2011, and from U.S. Application No. 61/421,754 filed Dec. 10, 2010.

TECHNICAL FIELD

The present disclosure relates generally to interference suppression and in particular to a radio base station and a method therein for measuring an interference suppression gain, predicting an air interface load based on the interference suppression gain and scheduling an uplink radio resource at least partly based on the predicted air interface load.

BACKGROUND

In WCDMA many users share the same frequency band. The transmission of one user thereby becomes interference for all other users in the uplink (and downlink). Interference is a problem for any receiver as it makes it difficult for the receiver to receive the sent out signal or transmission correctly. Often, errors are introduced in the received signal as a result of interference.

In order to reduce to effects of interference, Interference Suppression, IS, receivers are used. Such IS receivers enables better performance in terms of e.g. peak data rates, coverage, system throughput and system capacity.

A scheduler in a radio base station schedules users, or user equipments, on the mobile broadband uplink, denoted EUL, trying to exploit the available load headroom in the best possible way. Since the headroom varies due to the load caused by already scheduled users, this scheduling need to be fast. The scheduling is affected by delays of several scheduling intervals though, from the time a grant is scheduled and transmitted to a terminal, until the load appears on the uplink air interface as an interference power. This means that in order to be able to schedule so that the air interface load is kept below the maximum load (needed to maintain stability and coverage of the cell), the scheduler needs to predict the load that appears over the air interface, and it needs to do that accurately. In case without interference suppressing receivers this prediction can e.g. be performed deterministically and analytically using measured SIR values, together with beta factors that define the offset of the data power of a user, to the power controlled control channel. This load prediction is associated with errors, but is deemed sufficient for non-IS receivers.

When IS receivers are employed, the load prediction problems unfortunately become severe. In particular, the load appearing over the air interface is normally significantly reduced with IS receivers, as compared to non-IS receivers, the load reduction obtained by the IS receivers vary with the number of interfering users in the cell and the load reduction obtained by the IS receivers vary also with the bit rates of the interfering users in the cell.

Predicting the load appearing over the air interface is difficult for several reasons. There is a relatively long delay between sending an uplink transmission grant to a user equipment until the actual load appears on the air interface. The delays also vary making it even more difficult to take the delay into account when trying to predict the load appearing on the air interface. Still a problem is that user equipments may use or transmit with lower power than granted, which will also affect the load on the air interface and the interference situation on the air interface.

SUMMARY

It is an object of the exemplifying embodiments to address at least some of the problems outlined above. In particular, it is an object of the exemplifying embodiments to provide a radio base station and a method therein for scheduling an uplink radio resource to a first user equipment in a wireless communication system which employs Code Division Multiple Access, CDMA. These objects and others may be obtained by providing a radio base station and a method in a radio base station according to the independent claims attached below.

According to an aspect a method in a radio base station for scheduling an uplink radio resource to a first user equipment in a wireless communication system which employs CDMA is provided. The method comprises measuring an Interference Suppression, IS, gain for each user equipment in a set of user equipments currently being served by the radio base station. The method further comprises determining a user constellation pertaining to information regarding the different user equipments in the set of user equipments and their respective bitrates; and updating a table of IS gains with the measured IS gain in bins corresponding to the determined user constellation. The method further comprises predicting a load based on at least the updated table, and scheduling the uplink radio resource to the first user equipment at least partly based on the predicted load.

According to an aspect, a radio base station adapted to schedule an uplink radio resource to a first user equipment in a wireless communication system which employs CDMA is provided. The radio base station comprises a measuring unit adapted to measure an Interference Suppression, IS, gain for each user equipment in a set of user equipments currently being served by the radio base station. The radio base station further comprises a determining unit adapted to determine a user constellation pertaining to information regarding the different user equipments in the set of user equipments and their respective bitrates. Further, the radio base station comprises a managing unit adapted to update a table of IS gains with the measured IS gain in bins corresponding to the determined user constellation. The radio base station also comprises a prediction unit adapted to predict a load based on the updated table and a scheduler adapted to schedule the uplink radio resource to the first user equipment at least partly based on the predicted load.

The radio base station and the method therein have several advantages. One advantage is that the method and the radio base station enable load prediction for IS receivers, e.g. a G-rake+ receiver in Enhanced Uplink, EUL, of Wideband Code Division Multiple Access, WCDMA. A further advantage, which follows from the above advantage, is that they enable controlling the air interface load with high accuracy. Still a further advantage is that the method makes use of existing measurements, hence allowing early and relatively easy implementation on existing hardware. Yet an advantage is that margins needed to limit interference may be reduced which will enable more efficient exploitation of the uplink air interface. This in turn will improve coverage.

BRIEF DESCRIPTION OF DRAWINGS

Embodiments will now be described in more detail in relation to the accompanying drawings, in which:

FIG. 3*a* is an example of an IS gain table.

FIG. 3*b* is an example of a simplified IS gain table.

DETAILED DESCRIPTION

Briefly described, a radio base station and a method therein for scheduling an uplink radio resource to a first user equipment in a wireless communication system which employs Code Division Multiple Access, CDMA are provided.

Figure 1:
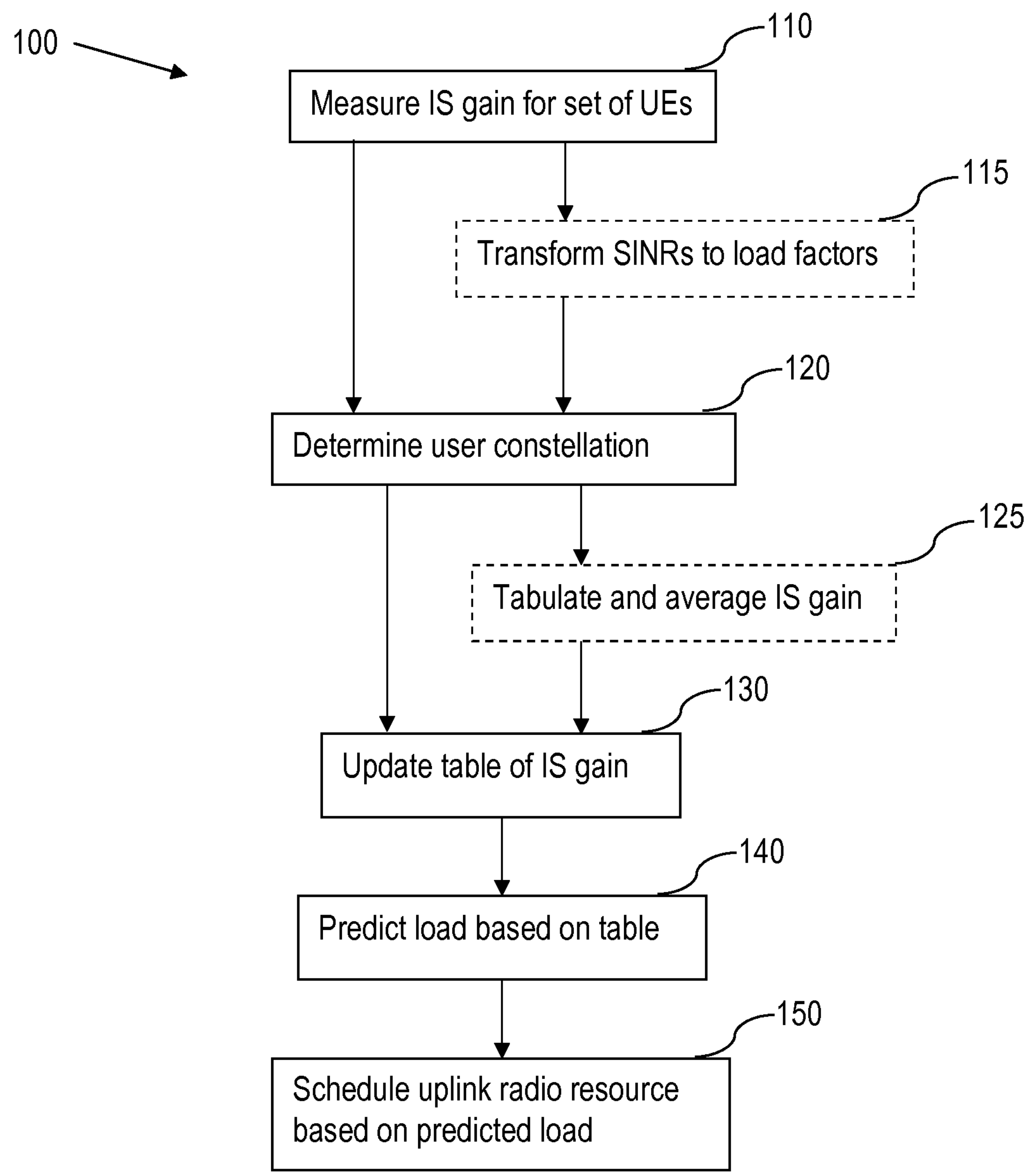
FIG. 1 is a flowchart of an exemplifying embodiment of a method in a radio base station for scheduling an uplink radio resource to a first user equipment in a wireless communication system.

FIG. 1 illustrates the method in a radio base station for scheduling an uplink radio resource to a first user equipment in a wireless communication system which employs CDMA comprising measuring 110 an Interference Suppression, IS, gain for each user equipment in a set of user equipments currently being served by the radio base station. The method further comprises determining 120 a user constellation pertaining to information regarding the different user equipments in the set of user equipments and their respective bitrates; and updating 130 a table of IS gains with the measured IS gain in bins corresponding to the determined user constellation. The method further comprises predicting 140 a load based on at least the updated table, and scheduling 150 the uplink radio resource to the first user equipment at least partly based on the predicted load.

The radio base station measures an IS gain for each user equipment in a set of user equipments currently being served by the radio base station. This means that the radio base station defines a set of user equipments out of all user equipments currently being served by the radio base station. The set of user equipments may comprise all of the user equipments currently being served by the radio base station or only a part of all the user equipments currently being served by the radio base station.

The radio base station also determines a user constellation pertaining to information regarding the different user equipments in the set of user equipments and their respective bitrates. Typically, a radio base station serves a variety of different user equipments simultaneously. The different user equipments may transmit in uplink using different bitrates. For example, some user equipments transmit at 640 kbit/s and some user equipments transmit at 960 kbit/s. Still some user equipments transmit at 1920 kbit/s. The user constellation comprises information pertaining to the number of user equipments in the set of user equipments for which the IS gain is measured by the radio base station. Further, the user constellation comprises information pertaining to the different bitrates used by the user equipments in the set of user equipments. Just as an example, a user constellation for a set of user equipments for which the IS gain is measured may comprise one user equipment transmitting at 640 kbit/s, three user equipments transmitting at 960 kbit/s and two user equipments transmitting at 480 kbit/s.

Once the radio base station has measured the IS gain for the set of user equipments and determined the user constellation, the method comprises updating an IS gain table. The IS gain table is updated with respect to the measured IS gain in bins corresponding to the determined user constellation. By updating the IS-gain table, the IS gain table becomes "self-learning", meaning that for a specific user constellation, the IS gain for that specific user constellation will thereafter be available to the radio base station.

When the radio base station is to schedule an uplink radio resource to the user equipment in the set of user equipments, the method comprises the radio base station predicting a load based on the updated table. The load is the load on the air interface in uplink. Depending on the load, the user equipment may be allotted or scheduled more or less radio resources in the uplink. The more the load, the more the interference generally. By predicting the load on the air interface, the radio base station then schedules the uplink radio resource to the first user equipment at least partly based on the predicted load.

The embodiment of the method described above has several advantages. One advantage is that the method enables load prediction for IS receivers, e.g. a G-rake+ receiver in Enhanced Uplink, EUL, of Wideband Code Division Multiple Access, WCDMA. A further advantage, which follows from the above advantage, is that it enables controlling the air interface load with high accuracy. Still a further advantage is that the method makes use of existing measurements, hence allowing early and relatively easy implementation on existing hardware. Yet an advantage is that margins needed to limit interference may be reduced which will enable more efficient exploitation of the uplink air interface. This in turn will improve coverage.

Examples of IS receivers are G-rake+ receivers, Frequency Domain Equaliser, FDE, receivers and Frequency Domain Pre-Equaliser, FDPE, receivers.

According to an embodiment, measuring 110 the IS gain for the set of user equipments comprises measuring an air interface load as seen after IS processing and an air interface load before IS processing.

In order to establish the IS gain, the air interface load as seen before IS processing and the air interface load as seen after IS processing are measured. By comparing the air interface load before and after IS processing, the IS gain is determined.

Without IS receivers, or without equalising, the load at the antenna connector is given by the noise rise, or rise over thermal, RoT(t), which is defined by $$RoT(t) = \frac{RTWP(t)}{N(t)}, \tag{1}$$

where N(t) is the thermal noise level as measured at the antenna connector. RTWP(t) represent a total wideband power and is defined by $$RTWP(t) = \rho_{i=1}{}^{I} P_i(t) + I^N(t) + N(t) \tag{2}$$

In equation (2) above, I is the number of user equipments, $I^N(t)$ denotes the power as received from N neighbour cells of a WCDMA system. The separation of thermal noise power and interference from neighbouring cells or neighbouring radio base stations may be difficult.

The signal reference points are, by definition at the antenna connectors. The measurements are however obtained after the analogue signal conditioning chain, in the digital receiver. The analogue signal conditioning chain introduces a scale factor error of about 1 dB (1-sigma) that is difficult to compensate for. Fortunately, all powers of (2) are equally affected by the scale factor error so when (1) is calculated, the scale factor error is cancelled as $$RoT^{DigitalReceiver}(t) = \frac{RTWP^{DigitalReceiver}(t)}{N^{DigitalReceiver}(t)} = \frac{\gamma(t)RTWP^{Antenna}(t)}{\gamma(t)N^{Antenna}(t)} = RoT^{Antenna}(t) \quad (3)$$

Further, $$I^N(t)+N(t)=E[I^N(t)]+E[N(t)]+\Delta I^N(t)+\Delta N(t) \quad (4)$$

In equation (4) E[ ] denotes a mathematical expectation and Δ denotes the variation around the mean. Since there are no measurements available in the radio base station that are related to the neighbor cell interference, a linear filtering operation can at best estimate the sum $E[I^N(t)]+E[N(t)]$. This estimate cannot be used to deduce the value of E[N(t)]. The situation is the same as when the sum of two numbers is available. Then there is no way to figure out the values of the individual numbers. Thus the noise power floor is not mathematically observable.

The scheduler of the EUL tries to predict the instantaneous load on the uplink air interface ahead of time. The scheduler tests different combinations of grants to determine the best combinations. As having been described above, this prediction is difficult for several reasons. The scheduling decision will only affect the air interface after a number of transmission time intervals, TTIs, each TTI being 2 or 10 ms, due to grant transmission latency and user equipment latency before the new grant takes effect over the air interface.

One approach for predicting the uplink load is using Signal to Noise and Interference Ratio, SINR. The prediction of uplink load for a tentative scheduled set of users and grants is based on the power relation:

$$P_{RTWP}(t)-P_N(t)=\sum_{i=1}^{I}L_i(t)P_{RTWP}(t)+P_{neighbour}(t) \quad (5)$$

In equation (5), $L_i(t)$ is the load factor of the i:th user, or user equipment, at time instant t and $P_{neighbour}(t)$ denotes the neighbour cell interference, or interference caused by neighbouring radio base station(s). The load factors of the own cell may be determined using SINR values as will be described below.

First it is noted that the carrier-to-interference ratio C/I of the i:th user, or user equipment, can be expressed as:

$$(C/I)_i(t) = \frac{P_i(t)}{P_{RTWP}(t)-(1-\alpha)P_i} = \frac{L_i(t)P_{RTWP}(t)}{P_{RTWP}(t)-(1-\alpha)L_i(t)P_{RTWP}(t)} = \frac{L_i(t)}{1-(1-\alpha)}L_i(t), \quad (6)$$

-continued whereby $$L_i(t) = \frac{(C/I)_i(t)}{1-(1-\alpha)(C/I)_i(t)},$$

$$i = 1, \ldots, I$$

In equation (6), I is the number of user equipments in the own cell, i.e. the cell associated with the radio base station comprising the receiver, and α is a self-interference factor. The $(C/I)_i(t)$ for i=1, . . . , I are then related to the SINR, as measured on the Dedicated Physical Control Channel, DPCCH, as follows:

$$(C/I)_i(t) = \frac{SINR_i(t)}{W_i}\frac{RxLoss}{G}*\left(1+\frac{\beta_{DPDCH,i}^2(t)+\beta_{EDPCCH,i}^2(t)+n_{codes,i}(t)\beta_{EDPCCH,i}^2(t)+\beta_{HSDPCCH,i}^2(t)}{\beta_{DPDCH,i}^2(t)}\right), \quad (7)$$

$$I = 1, \ldots, I$$

In equation (7), $W_i$ is the spreading factor, R×Loss represents missed receiver energy, or self interference, G is the diversity gain and the β:s are the beta factors of the respective channels, assuming inactive channels to have zero beta factors. EDPCCH is short for Enhanced PDCCH and HSDPCCH is short for High Speed DPCCH.

The uplink load prediction procedure then determines the uplink load of the own cell k TTIs later by a calculation of equations (6) and (7) for each user equipment of the own cell, followed by the summation:

$$L_{own}(t)=\sum_{i=1}^{I}L_i(t+kT) \quad (8)$$

Equation (8) can be transformed using equation (5) to:

$$P_{RTWP}(t)=L_{own}(t)P_{RTWP}(t)+P_{neighbour}(t)+P_N(t) \quad (9)$$

A division by $P_N(t)$ then shows that the RoT may be predicted k TTIs ahead as:

$$RoT(t+kT) = \frac{P_{neighbour}(t)/P_N(t)}{1-L_{own}(t)} + \frac{1}{1-L_{own}(t)} \quad (10)$$

Another approach for predicting the uplink load is direct load measurement. The load factor of a user equipment may be directly measured at the air interface as:

$$L_i(t) = \frac{P_i(t)}{P_{RTWP}(t)} \quad (11)$$

With IS receivers, measuring the air interface load as seen after IS processing and an air interface load before IS processing are different from measuring the air interface load for non-IS receivers.

According to an embodiment, the air interface load is measured as SINR.

SINR provides a measure of the air interface load as seen by the radio base station. The air interface load is dependent upon the so called noise power floor, interference from neighbouring radio base stations and user equipments being served by the neighbouring radio base stations. The air interface load is further dependent on the transmissions from the user equipments currently being served by the radio base station.

The difference with the interference suppressing G-rake+ receiver as compared to conventional G-rake receiver is that each user, or user equipment, sees a reduced level of interference, immediately after the weight combining step. In G-rake+, a covariance matrix $\hat{R}_i$, i=1, m . . . , I, with the order equal to the number of fingers is first estimated to capture the interference. The spreading codes not used by the present user u may be used in order to estimate $\hat{R}_i$.

A G-rake+ receiver uses the estimated covariance matrix that models the interference for computation of the combining weights for the users i, i=1, . . . , I.

$$\hat{R}_i\hat{w}_i=\hat{h}_i,\ i=1,\ldots,I \tag{12}$$

In equation (12), the $\hat{h}_i$ is the net channel response of order i and $\hat{w}_i$ are combining weights.

The effect of equation (11) is that a G-rake+ receiver essentially whitens the correlated interference and removes large spectral peaks from interferers at certain finger locations and for certain antenna elements.

A G-rake+ receiver is still a linear receiver. Another example of an IS receiver for WCDMA is called a chip equaliser which is also a linear receiver. The difference between the G-rake+ receiver and the chip equaliser is the order of certain basic operations.

One example of how to measure the SINR after IS processing by the G-rake+ receiver is given by:

$$SINR=\frac{\left(\hat{w}_i^H\hat{h}_i\right)^2}{\hat{w}_i^H\hat{R}_i\hat{w}_i} \tag{13}$$

The SINR before any IS receiver processing is obtained by measurement of the power and spread of the DPCCH channel (the pilot). In one example, the SINR is given by $$SINR=\frac{\left|\frac{1}{N_{symbols}}\Sigma_{symbols}S_{symbol}\right|^2}{\mathrm{Var}} \tag{14}$$

In equation (14) $N_{symbols}$ is the number of symbols, $S_{symbol}$ is symbol number S and Var is the variance. The variance, Var, may be expressed as:

$$\mathrm{Var}=\frac{1}{N}\left|S_{symbol}-\frac{1}{N_{symbols}}\Sigma_{pilotsymbols}S_{symbol}\right|^2 \tag{15}$$

The air interface load as seen after IS processing is also measured as SINR. Both for G-rake receivers and G-rake+ receivers, the SINR is measured or estimated using equation (13). The difference between G-rake receivers (without IS) and G-rake+ receivers (with IS) is in the way $\ddot{R}_i$ is calculated. The calculation of this matrix is obtained by averaging over unused codes for the G-rake+ receivers.

According to yet an embodiment, the method further comprises transforming 115 the SINR after IS processing and the SINR before IS processing to load factors.

By transformation of the SINR after IS processing and the SINR before IS processing to load factors, the need for neighbour cell estimation is eliminated.

According to an embodiment, the method further comprises determining the IS gain by determining a load factor difference between the air interface load before and after IS processing.

Before IS, using equations (6) to (8), an effective power offset, $\gamma_i(t)$, of user equipment is obtained. The effective power offset is closely related to the grant and bitrate, as given by decoded Transport Format Combination Indicator, TFCI, and Enhanced, TFCI, E-TFCI, which will be explained later below. The effective power offset may be expressed as:

$$\gamma_i(t)=\left(1+\frac{\beta_{DPDCH,i}^2(t)+\beta_{EDPCCH,i}^2(t)+n_{codes,i}(t)\beta_{EDPCCH,i}^2(t)+\beta_{HSDPCCH,i}^2(t)}{\beta_{DPDCH,i}^2(t)}\right) \tag{16}$$

The load factor before IS may then be expressed as:

$$L(t)=\sum_{i=1}^{I}\frac{SINR_i(t)\gamma_i(t)}{(G/RxLoss)W_i+(1-\alpha)SINR_i(t)\gamma_i(t)} \tag{17}$$

In equations (16) and (17), $\gamma_i(t)$ represents the effective power offset of the user equipment which is closely related to the grant and bitrate, as given by decoded TFCI and E-TFCI.

The load factor after IS is not straightforward to express. A first reason for this is that the load situation looks different for different user equipments, depending on the IS suppression gain experienced by the user equipment in question. A second problem is that this gain is not directly reflected by the SINR of a user equipment after IS—the reason being that the SINR is controlled by the Inner Loop Power Control, ILPC loop, keeping the SINR close to a SINR reference set by the outer power control loop. This way the performance of the link is maintained.

One example of expressing the load factor after IS processing is to use the same load factor definition as in (16) and (17), but with a SINR measure valid after IS processing.

$$\gamma_i(t)=\left(1+\frac{\beta_{DPDCH,i}^2(t)+\beta_{EDPCCH,i}^2(t)+n_{codes,i}(t)\beta_{EDPCCH,i}^2(t)+\beta_{HSDPCCH,i}^2(t)}{\beta_{DPDCH,i}^2(t)}\right) \tag{18}$$

$$L^{IS}(t)=\sum_{i=1}^{I}\frac{SINR_i^{IS}(t)\gamma_i(t)}{(G/RxLoss)W_i+(1-\alpha)SINR_i^{IS}(t)\gamma_i(t)} \tag{19}$$

It shall be noted that the effective power offset, $\gamma_i(t)$, of user equipment may be determined by other measures than the example given in equation (18), however, the determination of this quantity needs to rely on measurement of individual SINR of the user equipments being part of the user constellation.

An alternative example of determining the load factor before IS processing is direct measurement. This can be done using equation (11). The load factor before IS processing then results in:

$$L(t)=\sum_{i=1}^{I}\frac{P_i(t)}{P_{RTWP}(t)} \tag{20}$$

Denoting the air interface load factor of a cell associated with a radio base station L(t) and the effective air interface load factor after IS processing $L^{IS}(t)$ the IS gain may be expressed, in the load factor domain, as:

$$\Delta L^{IS}=L(t)-L^{IS}(t) \quad (21)$$

According to still an embodiment, determining 120 a user constellation comprises measuring Transport Format Combination Indicator, TFCI, and Enhanced-TFCI, E-TFCI used by user equipments in the set of user equipments.

In WCDMA, the uplink Dedicated Physical Data Channel, DPDCH, is used to carry dedicated data generated at layer 2 and higher, i.e. the dedicated transport channel (DCH). There may be zero, one, or a plurality of uplink DPDCHs on each layer 1 connection. The uplink Dedicated Physical Control Channel, DPCCH, is used to carry control information generated at layer 1. Control information consists of known pilot bits to support channel estimation for coherent detection, transmit power-control commands, feedback information and an optional TFCI. The TFCI informs the receiver about the instantaneous parameters of the different transport channels multiplexed on the uplink DPDCH, and corresponds to the data transmitted in the same frame. For each layer 1 connection, there is only one uplink DPCCH.

According to yet an embodiment, the method further comprises tabulating and averaging 125 the IS gain as a function of at least a subset of the user constellation.

In order to maintain and update the table of IS gains, the measured or determined IS gain is tabulated and averaged as a function of at least a subset of the user constellation. The table is in one example built such that the user equipment status of the uplink that affects the IS gains the most can be used to indicate a corresponding IS gain, expressed in the load factor domain. In other words, different user equipments in a set of user equipments will affect the uplink to different extents. Some user equipments will cause more interference in the uplink than others and some user equipments will cause substantially the same level of interference. The table of IS gains is built such that the user equipment which causes the highest level of interference in uplink can be used to indicate a corresponding gain.

In a first example, the table entries are created as a function of a subset of the number of uplink user equipments. In case the number of uplink users is high, the table will become very large. To reduce the size of the table, the number of uplink user equipments is divided into a number of high data rate users, above an uplink granted bit rate threshold and a number of remaining background low data rate user equipments, below the uplink granted bit rate threshold.

In a second example, the table entries are created as a function of a subset of granted bit rates of the user equipments. In case the IS gain table is very large, the granted bit rates of the user equipments are divided into the granted bit rates of the high data rate users, above the uplink granted bit rate threshold and the total granted bit rate of background low data rate user equipments, below the uplink granted bit rate threshold.

In a third example, the table entries are created as a function of a subset of the receiver type allocated to a user equipment. As stated before, there are different types of IS receivers, e.g. G-rake+ receivers, rake receivers, FDE receivers and FDPE receivers.

In a fourth example, the table entries are created as a function of a subset of the ratio between the selected user equipment's bit rate and the bitrate of the user equipment having the highest bitrate in the cell.

In a further example, spreading factor information, SINR target scaled by a beta factor or any other numbering scheme is used to replace the granted bit rate information. Other groupings to avoid an excessive table size are of course also possible, for example grouping of granted bitrates into bins covering a range of grants.

In order to adapt the table, each considered value of the uplink state or equivalently the uplink user constellation is updated with at least a sliding average of the selected IS gain. In addition to that, the variance can be estimated. By uplink state is hence meant the number of user equipments, their bitrates and the receiver type. The following recursive equations may be used:

$$\langle \Delta L^{IS} \rangle (t+T)=\alpha_3 \langle \Delta L^{IS} \rangle (t)+(1-\alpha_3)\Delta L^{IS}(t+T) \quad (22)$$

$$\langle (\Delta L^{IS})^2 \rangle (t+T)=\alpha_4 \langle (\Delta L^{IS})^2 \rangle (t)+(1-\alpha_4)(\Delta L^{IS}(t+T)- \langle \Delta L^{IS} \rangle (t)) \quad (23)$$

In equations (22) and (23), the $\langle\ \rangle$ indicates a time average approximation and the different α's represent different filter constants. According to an embodiment, the IS gain is expressed as a fraction of the total load at the air interface or after IS processing. This embodiment is illustrated in FIG. 3*a*. Additionally, a simplified table of IS gains is exemplified in FIG. 3*b*.

FIG. 3*a* is an example of an IS gain table assuming the load factor adaptation is used. The IS gain table is self-learning as it is continuously updated.

A normalization requires that the following averages are determined in case of normalisation with regard to the air interface SINR:

$$\langle L \rangle (t+T)=\alpha_3 \langle L \rangle (t)+(1-\alpha_3)L(t+T) \quad (24)$$

$$\langle (L)^2 \rangle (t+T)=\alpha_4 \langle (L)^2 \rangle (t)+(1-\alpha_4(L(t+T)- \langle L \rangle (t)) \quad (25)$$

In case of normalisation with the load after IS gains, the following is used in an example:

$$\langle L^{IS} \rangle (t+T)=\alpha_3 \langle L^{IS} \rangle (t)+(1-\alpha_3)L^{IS}(t+T) \quad (26)$$

$$\langle (L^{IS})^2 \rangle (t+T)=\alpha_4 \langle (L^{IS})^2 \rangle (t)+ (1-\alpha_4)(L^{IS}(t+T)- \langle L^{IS} \rangle (t)) \quad (27)$$

Also in equations (24)-(27), the different α's represent different filter constants.

In an example, one band comprises different carriers and multi-carriers. In such a scenario, each carrier is treated separately.

According to an embodiment of the method, the scheduling 150 of the uplink radio resource to the first user equipment comprises scheduling radio resources in WCDMA, Enhanced Uplink, EUL.

Enhanced Uplink, EUL, is specified in 3GPP Release 6 and has been extended with additional transport and control channels, such as the enhanced dedicated channel (E-DCH), and with similar features to High-Speed Uplink Packet Access. EUL is designed to support the needs of mobile broadband with increased performance in the uplink.

According to still an embodiment, the scheduling 150 the uplink radio resource to the first user equipment comprises scheduling radio resources in Time Division Multiplexing, TDM uplink.

In the 3GPP release 99, the Radio Network Controller, RNC, controls resources and user mobility. Resource control in this framework means admission control, congestion control, channel switching (roughly changing the data rate of a connection). Furthermore, a dedicated connection is carried over a dedicated channel DCH, which is realized as a DPCCH (Dedicated Physical Control Channel) and a DPDCH (Dedicated Physical Data Channel).

In the evolved 3G standards, decision making is becoming decentralised, and in particular the control over the short term data rate of the user connection. The uplink data is then allocated to Enhanced Dedicated Channel, E-DCH, which is realized as the triplet: a DPCCH, which is continuous, an E-DPCCH for data control and an E-DPDCH for data. The two latter are only transmitted when there is uplink data to send. Hence the Node B uplink scheduler determines which transport formats each user can use over E-DPDCH. The RNC is however still responsible for admission control.

Figure 4:
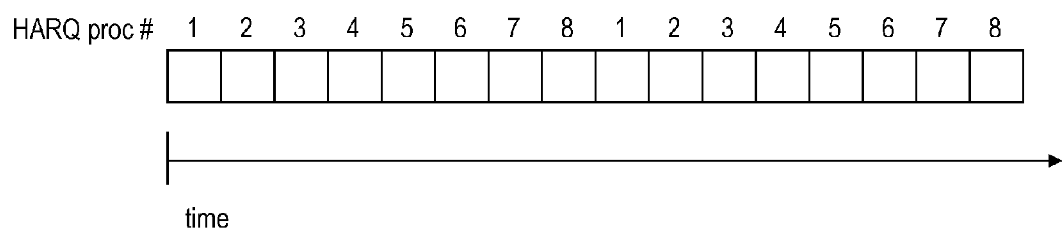
FIG. 4 is a block diagram illustrating 8 parallel HARC processes.

A data block is sent by the user equipment to the radio base station or NodeB during a transmission time interval (TTI). For efficiency reasons, the received data blocks at the receiver are processed in parallel at M parallel processors taking turn to process data. While data block i is processed and decoding information is fed back to the transmitter, the receiver starts processing data blocks b, b+1, . . . . By the time when the receiver processor 1 has decoded the data block and fed back the decoding result, it is ready for processing either a retransmission of information related to the recently processed data or a new data block. By combining information both from the original data block and the retransmission, it is possible to correct errors in the reception. A retransmission scheme with both error correction and error detection is referred to hybrid ARQ. Therefore, the M processes are often referred to as HARQ processes, each handling a data block received in a TTI. FIG. 4 depicts parallel HARQ processes for M=8.

In the WCDMA uplink, there is a trade-off between coverage and enabled peak rates. This is even more emphasized with enhanced uplink, which supports higher bit rates than ordinary dedicated channels. The uplink resources are limited by the RoT that the cell can tolerate. The RoT limit is either motivated by coverage requirements or power control stability requirements. When only one user is connected in the cell, both power control stability and coverage are minor issues, since the uplink interference is likely to be dominated by the power generated by this user.

Figure 5:
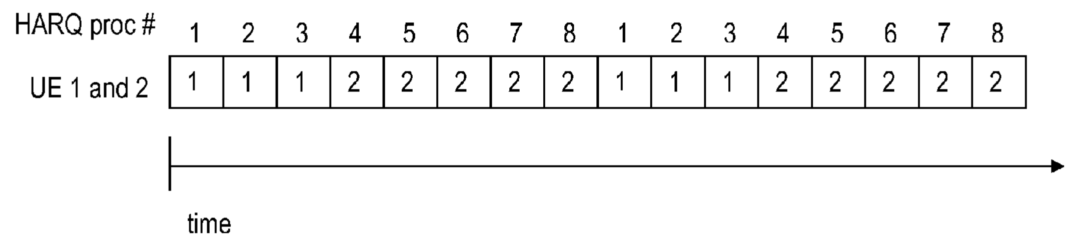
FIG. 5 is a block diagram illustrating 8 parallel HARC processes with two UEs being assigned the HARQ processes.

In order to orthogonalize the uplink user equipment transmissions to a greater extend, one example is to separate the user data transmissions in time, and employ a TDM scheme. In an example, grants which are only valid for specified HARQ processes are allocated to a user equipment. In this manner, TDM for EUL is enabled. Furthermore, employing TDM in this manner allows retransmissions without interfering with other user equipments, since retransmissions hit the same HARQ process as the original transmission. FIG. 5 provides some example resource allocations in a TDM setting. In FIG. 5, two user equipments 1 and 2 are allocated the available HARQ processes. FIG. 5 further depicts 8 parallel HARC processes.

In an example, the IS gain is measured and/or determined per HARQ process. This means that the measurement of SINR before and after IS gains needs to be done per HARQ process. One table is enough, providing division between HARQ processes, however at least equations (22)-(23) are preferably performed per HARQ process, possibly also (24)-(27).

In an example of a multi-cell scenario, additional information is included in the IS gain table, which information may be available or estimated. Some examples of such information are a geometry factor and interference level in strongest neighbouring radio base station. The geometry factor may e.g. be estimated through Channel Quality Indication, CQI, or through direct measurement of Received Signal Code Power, RSCP, to serving radio base station relative strongest other radio base station. The interference level may be indicated as "on/off", similar to the overload indicator in the Long Term Evolution, LTE, system.

In order to make use of the built-up information on IS gains in the table of IS gains, the procedure is, in an example, to calculate the load factors of the user equipments currently being served by the radio base station, as seen before IS processing, i.e. as if there would not be any IS receiver. This is e.g. done by using target SINR values. Then look up the HARQ process, current number of users and their bitrates as well as the receiver type from information comprised in the scheduler of the radio base station. Find the closest, or even the exact, entry in the IS gain table according to a selected criterion. Adjust the determined or predicted load factor of the uplink air interface with the tabulated mean of the IS gain to obtain a predicted load over the uplink air interface and possibly adjust further, in response to the tabulated variance. Then schedule user equipments using load factors adjusted with IS gains.

Embodiments herein also relate to a radio base station adapted to schedule an uplink radio resource to a first user equipment in a wireless communication system which employs Code Division Multiple Access, CDMA.

Such a radio base station will now be described with reference to FIG. 2. The radio base station has the same objects and advantages as the method performed therein and will only be described in brief in order to avoid unnecessary repetition.

Figure 2:
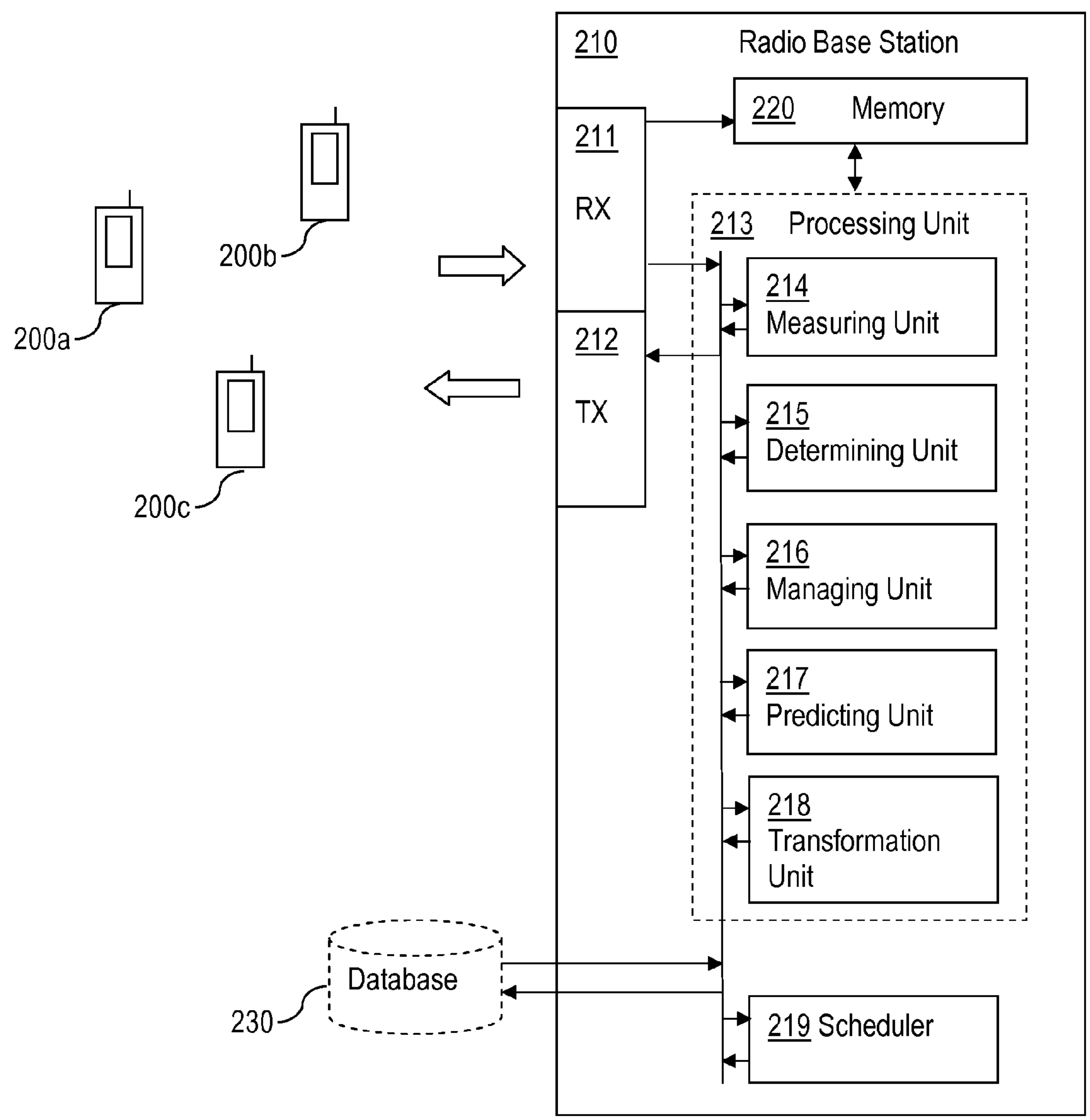
FIG. 2 is a block diagram of an exemplifying embodiment of a radio base station adapted to schedule an uplink radio resource to a first user equipment in a wireless communication system.

FIG. 2 illustrates the exemplifying embodiment of a radio base station 210 adapted to schedule an uplink radio resource to a first user equipment 200*a* in a wireless communication system, which employs CDMA, comprising a measuring unit 214 adapted to measure an Interference Suppression, IS, gain for each user equipment 200*a*, 200*b* and 200*c* in a set of user equipments currently being served by the radio base station 210. The radio base station 210 further comprises a determining unit 215 adapted to determine a user constellation pertaining to information regarding the different user equipments in the set of user equipments and their respective bitrates. Further, the radio base station 210 comprises a managing unit 216 adapted to update a table of IS gains with the measured IS gain in bins corresponding to the determined user constellation. The radio base station 210 also comprises a prediction unit 217 adapted to predict a load based on the updated table and a scheduler 219 adapted to schedule the uplink radio resource to the first user equipment at least partly based on the predicted load.

FIG. 2 illustrates the radio base station comprising a receiver arrangement 211 and a transmitter arrangement 212, by means of which the radio base station 210 communicates with user equipments 200*a*-200*c* currently being served by the radio base station. FIG. 2 further illustrates the radio base station comprising a processing unit 213 comprising dedicated units 214-218 for performing the above mentioned measuring, determining, managing and predicting features. The processing unit 213 is in an example implemented e.g. by one or more of: a processor or a micro processor and adequate software stored in a memory, a Programmable Logic Device (PLD) or other electronic component(s) or processing circuit(s) configured to perform the actions mentioned above FIG. 2 also illustrates the radio base station comprising a scheduler 219 adapted to schedule uplink radio resources to the user equipments 200*a*-200*c* currently being served by the radio base station 210. Further, FIG. 2 illustrates the radio base station 210 comprising a memory 220, which in one example comprises the IS gain table. In an alternative example, the radio base station is connected to a database 230 comprising the IS gain table. The database may for example be a standalone node, an Operation, Administration and Maintenance node or a core network node.

According to an embodiment, the measuring unit 214 is adapted to measure the IS gain for the set of user equipments by measuring an air interface load as seen after IS processing and an air interface load before IS processing.

According to still an embodiment, the air interface load is measured as Signal to Interference and Noise Ratio, SINR.

According to yet an embodiment, the radio base station 210 further comprises a transformation unit 218 adapted to transform the SINR after IS processing and the SINR before IS processing to load factors.

In still an embodiment, the determination unit 215 is further adapted to determine the IS gain by determining a load factor difference between the air interface load before and after IS processing.

In an embodiment, the measuring unit 214 is adapted to measure Transport Format Combination Indicator, TFCI, and Enhanced-TFCI, E-TFCI used by user equipments in the set of user equipments and wherein the determination unit 215 is further adapted to determine a user constellation based on the measured TFCI, and Enhanced-TFCI, E-TFCI used by user equipments in the set of user equipments.

According to an embodiment, the managing unit 216 further is adapted to tabulate and average the IS gain as a function of at least a subset of the user constellation.

According to yet an embodiment, the scheduler 219 is adapted to schedule the uplink radio resource to the first user equipment by scheduling radio resources in Wideband Code Division Multiple Access, WCDMA, Enhanced Uplink, EUL.

According to still an embodiment, the scheduler 219 is adapted to schedule the uplink radio resource to the first user equipment by scheduling radio resources in Time Division Multiplexing, TDM uplink.

It should be noted that FIG. 2 merely illustrates various functional units in the radio base station in a logical sense. The functions in practice may be implemented using any suitable software and hardware means/circuits etc. Thus, the embodiments are generally not limited to the shown structures of the radio base station and the functional units. Hence, the previously described exemplary embodiments may be realised in many ways. For example, one embodiment includes a computer-readable medium having instructions stored thereon that are executable by the processing unit for executing the method. The instructions executable by the computing system and stored on the computer-readable medium perform the method steps of the present invention as set forth in the claims.

FIG. 2 schematically shows an embodiment of a radio base station 210 in a network node. Comprised in the radio base station 210 are here a processing unit 213, e.g. with a DSP (Digital Signal Processor). The processing unit 213 may be a single unit or a plurality of units to perform different actions of procedures described herein. The radio base station 210 may also comprise an input unit for receiving signals from other entities, and an output unit for providing signal(s) to other entities. The input unit and the output unit may be arranged as an integrated entity.

Furthermore, the radio base station 210 comprises at least one computer program product in the form of a non-volatile memory, e.g. an EEPROM (Electrically Erasable Programmable Read-Only Memory), a flash memory and a hard drive. The computer program product comprises a computer program, which comprises code means, which when executed in the processing unit 213 in the radio base station 210 causes the radio base station to perform the actions e.g. of the procedure described earlier in conjunction with FIG. 1.

The computer program may be configured as a computer program code structured in computer program modules. Hence, in an exemplifying embodiment, the code means in the computer program of the radio base station 210 comprises a measuring module for measuring an Interference Suppression, IS, gain for each user equipment in a set of user equipments currently being served by the radio base station. The computer program further comprises a determining module for determining a user constellation pertaining to information regarding the different user equipments in said set of user equipments and their respective bitrates. The computer program further comprises a managing module for updating a table of IS gains with the measured IS gain in bins corresponding to the determined user constellation. Still further, the computer program could further comprise a prediction module for predicting a load based on the updated table. The computer program could further comprise other modules for providing other desired functionality.

The modules could essentially perform the actions of the flow illustrated in FIG. 1, to emulate the radio base station 210. In other words, when the different modules are executed in the processing unit 213, they may correspond to the units 214-218 of FIG. 2.

Although the code means in the embodiment disclosed above in conjunction with FIG. 2 are implemented as computer program modules which when executed in the processing unit causes the radio base station 210 to perform the actions described above in the conjunction with figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the radio base station.

It is to be understood that the choice of interacting units or modules, as well as the naming of the units within this disclosure are only for exemplifying purpose, and nodes suitable to execute any of the methods described above may be configured in a plurality of alternative ways in order to be able to execute the suggested procedure actions.

It should also be noted that the units or modules described in this disclosure are to be regarded as logical entities and not with necessity as separate physical entities While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method in a radio base station comprising an interference suppression, IS, receiver for scheduling an uplink radio resource to a first user equipment in a wireless communication system which employs Code Division Multiple Access, CDMA, the method comprising:

measuring an IS gain for one or more of user equipments in a set of user equipments currently transmitting in uplink to the radio base station, using the IS receiver;

determining which of a plurality of user constellations pertaining to information regarding the set of user equipments currently transmitting in uplink to the radio base station and the respective bitrates of said set of user equipments corresponds to each of the one or more of the user equipments in the set of user equipments;

updating a table of IS gains corresponding to the plurality of user constellations by using the measured IS gain to update an IS gain in the table that corresponds to the determined user constellation for each of the one or more of the user equipments in the set of user equipments;

predicting a load based on said updated table;

scheduling the uplink radio resource to the first user equipment at least partly based on said predicted load; and transmitting a grant of the uplink radio resource to the first user equipment via the wireless communication system based on the scheduling.

2. The method according to claim 1, wherein measuring the IS gain for the one or more user equipments comprises measuring an air interface load as seen after IS processing and an air interface load before IS processing for each of the one or more user equipments.

3. The method according to claim 2, wherein the air interface load is measured as Signal to Interference and Noise Ratio, SINR.

4. The method according to claim 3, further comprising transforming said SINR after IS processing and said SINR before IS processing to load factors.

5. The method according to claim 4, wherein said IS gain is determined by determining a load factor difference between the air interface load before and after IS processing.

6. The method according to claim 1, wherein determining a user constellation comprises measuring Transport Format Combination Indicator, TFCI, and Enhanced, TFCI, E-TFCI, used by the one or more of the user equipments in the set of user equipments.

7. The method according to claim 1, further comprising tabulating and averaging the IS gain as a function of at least a subset of the user constellation.

8. The method according to claim 1, wherein said scheduling the uplink radio resources to the first user equipment comprises scheduling radio resources in Wideband CDMA, WCDMA, Enhanced Uplink, EUL.

9. The method according to claim 1, wherein said scheduling the uplink radio resource to the first user equipment comprises scheduling radio resources in Time Division Multiplexing, TDM, uplink.

10. A radio base station adapted to schedule an uplink radio resource to a first user equipment in a wireless communication system which employs Code Division Multiple Access, CDMA, the radio base station comprising:

an interference suppression, IS, receiver;

a processor; and a non-volatile memory coupled to the processor and comprising computer readable program code that when executed by the processor causes the processor to perform operations comprising:

measuring an Interference Suppression, IS, gain for one or more of user equipments in a set of user equipments currently being served by the radio base station, using the IS receiver;

determining a user constellation pertaining to information regarding the different user equipments in said set of user equipments and their respective bitrates for each of the one or more of the user equipments in the set of user equipments;

updating a table of IS gains by using the measured IS gain to update a bin in the table that corresponds to the determined user constellation for each of the one or more of the user equipments in the set of user equipments;

predicting a load based on said updated table;

scheduling the uplink radio resource to the first user equipment at least partly based on said predicted load, and transmitting a grant of the uplink radio resource to the first user equipment via the wireless communication system based on the scheduling.

11. The radio base station according to claim 10, wherein the measuring unit is adapted to measure the IS gain for the one or more user equipments by measuring an air interface load as seen after IS processing and an air interface load before IS processing for each of the one or more user equipments.

12. The radio base station according to claim 11, wherein the air interface load is measured as Signal to Interference and Noise Ratio, SINR.

13. The radio base station according to claim 12, further comprising a transformation unit adapted to transform said SINR after IS processing and said SINR before IS processing to load factors.

14. The radio base station according to claim 13, wherein the determination unit further is adapted to determine said IS gain by determining a load factor difference between the air interface load before and after IS processing.

15. The radio base station according to claim 10, wherein the measuring unit is adapted to measure Transport Format Combination Indicator, TFCI, and Enhanced-TFCI, E-TFCI used by the one or more of the user equipments in the set of user equipments and wherein the determination unit is further adapted to determine a user constellation based on the measured TFCI, and Enhanced-TFCI, E-TFCI used by the one or more of the user equipments in the set of user equipments.

16. The radio base station according to claim 10, wherein the managing unit further is adapted to tabulate and average the IS gain as a function of at least a subset of the user constellation.

17. The radio base station according to claim 10, wherein the scheduler is adapted to schedule the uplink radio resource to the first user equipment by scheduling radio resources in Wideband Code Division Multiple Access, WCDMA, Enhanced Uplink, EUL.

18. The radio base station according to claim 10, wherein the scheduler is adapted to schedule the uplink radio resource to the first user equipment by scheduling radio resources in Time Division Multiplexing, TDM uplink.

19. The method according to claim 1, further comprising:
receiving data from the first user equipment via the scheduled uplink radio resource.

20. The radio base station according to claim 10, wherein the operations further comprise:
receiving data from the first user equipment via the scheduled uplink radio resource.

* * * * *